United States Patent
Gkiotsalitis et al.

(10) Patent No.: US 9,953,539 B1
(45) Date of Patent: Apr. 24, 2018

(54) METHOD AND SYSTEM FOR PROVIDING DEMAND-RESPONSIVE DISPATCHING OF A FLEET OF TRANSPORTATION VEHICLES, AND A MOBILITY-ACTIVITY PROCESSING MODULE FOR PROVIDING A MOBILITY TRACE DATABASE

(71) Applicant: NEC Europe Ltd., Heidelberg (DE)

(72) Inventors: Konstantinos Gkiotsalitis, Frankfurt (DE); Francesco Alesiani, Heidelberg (DE); Nitin Maslekar, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/470,957

(22) Filed: Mar. 28, 2017

(51) Int. Cl.
| | |
|---|---|
| G05D 3/00 | (2006.01) |
| G08G 1/00 | (2006.01) |
| G06N 99/00 | (2010.01) |
| G06F 17/30 | (2006.01) |
| G05D 1/00 | (2006.01) |
| G06N 5/04 | (2006.01) |

(52) U.S. Cl.
CPC ........... *G08G 1/202* (2013.01); *G05D 1/0027* (2013.01); *G06F 17/30241* (2013.01); *G06N 5/04* (2013.01); *G06N 99/005* (2013.01)

(58) Field of Classification Search
CPC ............................. G08G 1/202; G05D 1/0027
See application file for complete search history.

(56) References Cited

U.S. PATENT DOCUMENTS

| | | |
|---|---|---|
| 6,148,199 A | 11/2000 | Hoffman et al. |
| 6,484,148 B1 | 11/2002 | Boyd |
| 9,042,908 B2 | 5/2015 | Dai et al. |
| 9,754,490 B2* | 9/2017 | Kentley ................ G08G 1/202 |
| 2003/0014286 A1* | 1/2003 | Cappellini ............ G06Q 10/02 705/5 |
| 2003/0097484 A1 | 5/2003 | Bahl |
| 2004/0088392 A1* | 5/2004 | Barrett ................... G01C 21/26 709/223 |

* cited by examiner

Primary Examiner — Adam M Alharbi
(74) Attorney, Agent, or Firm — Leydig, Voit & Mayer, Ltd.

(57) ABSTRACT

A method for providing a demand-responsive transportation system includes receiving mobility trace data of collaborative individuals. Clusters of individuals are generated and mobility-activity models for the clusters are defined. Non-collaborative individuals are assigned to the clusters using a combinatorial optimization problem. An Origin-Destination (OD) demand is determined from the clusters. Non-collaborative individuals are re-allocated to different ones of the clusters using an approximation function that learns from an observed OD and the mobility trace data. The mobility-activity models are trained based on the re-allocation of the non-collaborative individuals to different ones of the clusters. An OD database (OD-DB) is maintained to be queried with a geographic location and time so as to receive information from the OD-DB about the current OD demand for the geographic location and time. Control actions are issued to vehicles in a fleet of the transportation system based thereon.

15 Claims, 5 Drawing Sheets

METHOD AND SYSTEM FOR PROVIDING DEMAND-RESPONSIVE DISPATCHING OF A FLEET OF TRANSPORTATION VEHICLES, AND A MOBILITY-ACTIVITY PROCESSING MODULE FOR PROVIDING A MOBILITY TRACE DATABASE

FIELD

The invention relates to a method and system for providing a mobility trace database for collaborative and non-collaborative individuals, and to a method and system for interfacing with on-demand transportation applications, in particular to provide on-demand transportation services using an automated fleet dispatcher and the mobility trace database.

BACKGROUND

Mobility trace content of individuals (e.g., citizens of an urban area) provides information about the individuals and their movements over time. While such information could be useful for a number of applications, heretofore it has not been possible scale this information to provide reliable information for larger areas and a greater number of included individuals, for example, as in transit passengers within a city network. Further, such information is typically limited to collaborative users who choose to share their information.

U.S. Pat. Nos. 6,484,148 and 9,042,908 attempt to describe the mobility of people with higher granularity using proposed classification models based on historical data for identifying the activities of individuals and the sequence of their movements between different activities. However, these models are always limited to small fractions of the population that share their personal data logs (i.e., cellular data traces) and cannot scale up to cover the entire city population or be used to facilitate efficient on-demand transportation applications. U.S. Pat. No. 6,148,199 discusses communication in a mobility database.

SUMMARY

In an embodiment, the present invention provides a method for providing a demand-responsive transportation system. Mobility trace data of collaborative individuals is received. Clusters of individuals are generated based on mobility-activity patterns of the collaborative individuals and a mobility-activity model for each of the clusters is defined. Non-collaborative individuals are assigned to the clusters using a combinatorial optimization problem. An OD demand is determined from the clusters including the collaborative and the non-collaborative individuals. At least some of the non-collaborative individuals are re-allocated to different ones of the clusters using an approximation function that learns from an observed OD and the mobility trace data of the collaborative users. The mobility-activity models are trained based on the re-allocation of the non-collaborative individuals to different ones of the clusters. An OD database (OD-DB) including a current OD demand determined from the trained mobility-activity models is maintained. The OD-DB is queried with a geographic location and time so as to receive information from the OD-DB about the current OD demand for the geographic location and time. Control actions are issued to vehicles in a fleet of the transportation system using real-time information about the fleet and the information about the current OD demand from the OD-DB.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
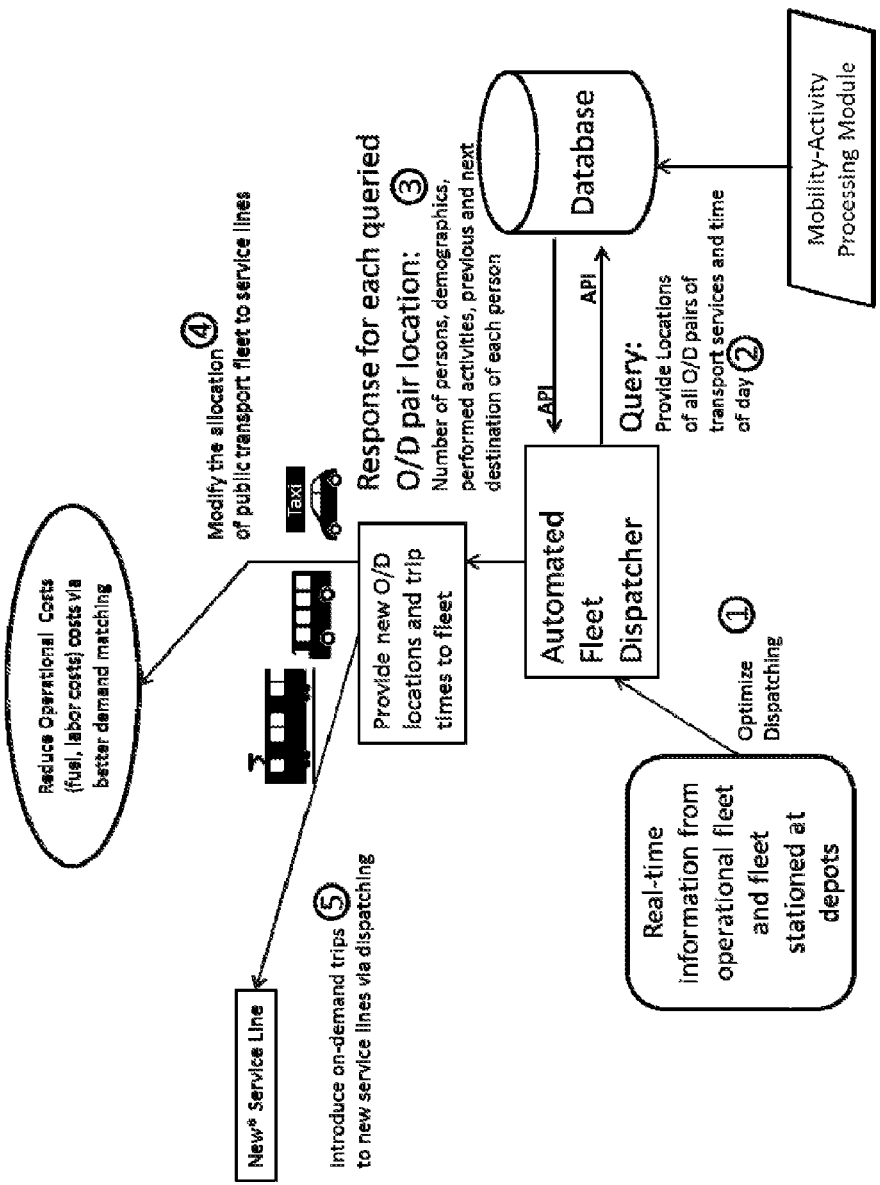
FIG. 1 is a schematic overview of a system according to an embodiment of the invention for demand-responsive dispatching of a transportation fleet.

In an embodiment, the invention provides a mobility-activity processing module for creating, modifying and querying mobility trace database content and a system which interfaces applications and the database. The module is able to build a mobility structure that infers the temporal and spatial relationship of the database elements and a set of attributes of each element (demographic groups, activities, travel sequences). For building the mobility structure, it uses two sets of groups: the collaborative users of a city/area who provide user-generated information continuously (e.g., through social media and/or public transport smart cards) and the non-collaborative users of the city/area. A combinatorial problem is used to compute an optimal allocation/assignment of the non-collaborative users to clusters and physical locations based on reference mobility-activity models of the collaborative users. A learning-based mutation of the mobility-activity models for the continuously updated allocation of users to continuously updated mobility-activity pattern clusters uses an approximation function that learns from data updates regarding the (i) observed Origin-Destination (OD) demand and (ii) the collaborative users' mobility-activity patterns. The database can thereby provide, for example, the number of persons, the demographics of those persons, the activities of those persons and their travel sequence based on a queried time of the day and the location.

Mobility trace content of individuals provides information together with specific information about users such as preferences, undertaken activities, sequence of trips, etc. Solutions to technical problems, such as on-demand public transportation dispatching, can advantageously use information regarding passengers' preferences and their spatio-temporal variations during the day to try to more efficiently match passenger demands. Therefore, structuring and populating a database that contains (i) the movements of persons in an urban area and (ii) the underlying reasons behind those movements can provide for improvements in several technical applications. An automatic system for populating, modifying and querying mobility trace database content and a system which interfaces applications and the database addresses the problems of current applications that work with historical data and try to predict the future without the ability to explain (a) the reasons behind the spatio-temporal variation of the mobility of individuals or actors; (b) the sequence of trips and (c) the demographics of travelers.

In an embodiment, the present invention provides an automated system for populating, modifying and querying database content of mobility traces and a method for interfacing with applications in need of aggregated mobility/activity/demographics/travel-sequence information of the entire area (e.g., city) population. According to different embodiments, the individuals and the population may consist of persons, goods and/or services. As used herein, the term geographical location may refer to actual geographical coordinates, coordinates of transport system (e.g., underground metro system, bus stops) or a graph of services.

At the proposed interface, the application queries the database. Two types of actions are considered (Query and Response). The Query action provides:
1. The geographical locations of the area/city for which the application is interested.
2. The times of the day for which the application is interested.
3. The type of spatial and temporal relationship requested.

The database responds back using a dedicated Application Program Interface (API). The Response action returns:
1. The mobility of individuals (persons/goods/services) at this location at that time of day (e.g., number of persons visiting that location or the probability of finding).
2. The demographics of those individuals (e.g., percentage of for age group, etc.).
3. The travel patterns of those individuals (e.g., where those persons have been before visiting that location and where will most likely be their next destination).
4. The activities of those persons that are at this location (e.g., 60% are there for work-related purposes, 20% for leisure whereas 20% have their home place there).

An example of the form of the database is depicted in Table I below as:

The database can be queried backwards (e.g., perform Query action for one city location regarding the previous day), forwards (e.g., perform Query action for the next day/month) or a full location Query can be requested where a Response action is provided for all locations in the city (whole city).

A preferred embodiment of the invention is used for the particular application of an on-demand/demand-responsive transportation of individuals. On-demand transport is a user-oriented form of transport characterized by flexible routing and ad-hoc scheduling of small/medium vehicles operating between pick-up and drop-off locations according to the passengers' requests. One of the key challenges for the transportation provider in such deployment is to predict the demand and adequately deploy the services in the place(s) where the demand is supposed to be at a given time of the day. Timely and efficient resource allocation is the key for the system's sustainability. Efficient deployment of vehicles can better match user demands, better adapt to schedules to decrease transfer, waiting and total travel times, save fuel costs and resources, lower emissions by requiring less trips, improve traffic in the city and offer a number of other benefits to transportation systems. The impact of on-demand transport can also be measured by the ability to serve users with the most appropriate vehicle for the purpose at hand, at the lower possible cost without technical aspects such as a risk of delay or maintenance.

To effect these improvements to a transportation system in an embodiment of the present invention schematically illustrated in FIG. 1, an automated dispatcher or Automated Fleet Dispatcher (AFD) is provided. The AFD balances the allocation of fleets according to user requests using the OD-DB which stores the information from the mobility-activity processing module. Through queries to the OD-DB, the AFD is able to acquire information, such as the number of passengers at a specific location (pickup or deploy location), or, for example, can predict the most appropriate location for parking in standby for a vehicle or allocate requests to specific vehicles based on the time/location of origin and destination of the requests and the expected arrival time at various intermediate locations. The mobility-activity processing module populates the OD-DB with user-generated data from collaborative users and information about city

TABLE I

Example of a mobility trace database.

| Entry I Time | Entry II City Location | Entry III No of persons | Entry IV Demographics | Entry V Activities | Entry VI Travel Sequence |
| --- | --- | --- | --- | --- | --- |
| 16 Sep. 2016, 9 am | Location 1 | 750 | (30% men, 70% women), (25% <25 y.o., 50% >=25 y.o., and <55 y.o., 25% >25 y.o. | 60% leisure, 20% work-related, 20% home location | (40% of persons' origin was Location 3, 60% of persons' origin was Location 2), 55% of persons' next destination is Location 2, 45% of persons' next destination is Location 3) |
| 16 Sep. 2016, 9 am | Location 2 | 323 | — | — | — |
| 16 Sep. 2016, 9 am | Location 3 | 152 | — | — | — |
| — | — | — | — | — | — | zones and city population. Accordingly, the system interfaces with the OD-DB to provide demand-responsive dispatching of fleet (e.g., public transport fleet, public safety fleet, private fleet that offers mobility services, etc.).

According to an embodiment, the AFD interfaces with the OD-DB and can perform the following steps/actions:
1. Acquires real time data from the fleet, AFD users and external sources (e.g., weather, traffic information sources, etc.). The data includes information such as fleet location, fleet type, fleet purpose, fleet mode type, requests served, request origin and destination time and location, travel time between locations, etc. The same information is fed into the OD-DB;
2. Queries, preferably simultaneously with acquiring data, the OD-DB for information (e.g., OD matrices) along with time periods of the day and location of the city (e.g., this information is provided from a combination of Database Entries I, II, III in Table I above).
3. Combines the real-time data from step/action 1 and the queried OD information from step/action 2 to produce a list of control actions (e.g., request to satisfy and route to be taken with stops and get on/get off users) for vehicles where the transportation facilities (e.g., vehicles) need to be placed at a given point in time and space in the day.
4. Provides alerts and/or notifications to fleet vehicles including, for example, new routes or locations and times or to users via an appropriate interface or transport application.
5. Updates routes, locations, times and/or schedules of the fleet, for example, including automatically updating online schedules and/or signs at transit stops.
6. Provides notifications and/or suggestions to drivers of fleet vehicles about (i) changes to their routes and (ii) changes to the starting times of their trips via on-board communication units that contain an onboard computer that communicates with the AFD with the use of a mobile communication standard (e.g., 3G, 4G).
7. Provide updates to autonomous driving fleet vehicles regarding changes on their trips, the starting times of their scheduled trips and changes at the origin-destination points of those trips via on-board communication units that contain an onboard computer that communicates with the AFD with the use of a mobile communication standard (i.e., 3G, 4G)
8. Communicates with the electronic displays at public transport stops to update the displayed expected arrival times of fleet vehicles.
9. Communicates with mobile phone applications that inform the users about the public transport and taxi operations in a city with the use of a tailored API in order to update the information regarding transport operation changes.
10. Directs the control actions to the vehicles and, based on the type of service, the following steps/actions are taken by the vehicles:
   a. The on-board unit processes the data and modifies the destination location where it can get users on/off for that time of the day.
   b. In case of public transport, the AFD indicates where the passenger demand varies from its expected value and re-allocates the available fleet to the existing service lines or generates new lines.
   c. Autonomous vehicles can be programmed to go to a certain location, at a certain time.

In case a demand cannot be satisfied with the vehicles in the current fleet, a new service (e.g., additional vehicle) can be deployed by the AFD. The AFD can also generate dedicated on-demand trips to cover special demographic groups and spatio-temporal demand variations.

Thus, the public transportation fleet, the public safety fleet or a private pool of vehicles that offer mobility services can be benefited from the AFD control measures because of the modification of their schedules according to the demand needs in a responsive manner instead of a static one. New services can be generated on-demand and the frequencies of already existing services can be updated for matching the demand better, thereby resulting in more efficient vehicle utilization. Accordingly, the operational costs are reduced while the scheduled trips are responsively adapted to the demand needs in space and time.

Figure 2:
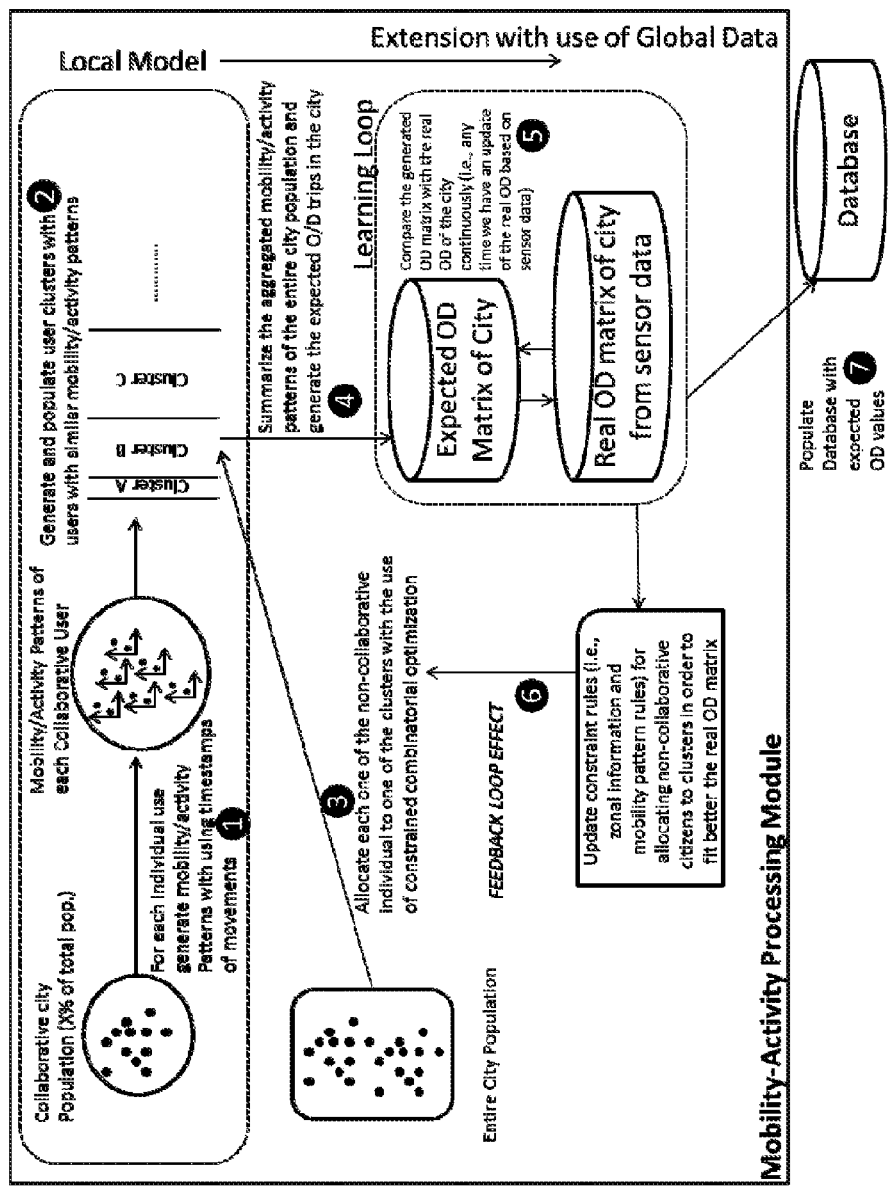
FIG. 2 is a schematic overview of a mobility-activity processing module according to an embodiment of the invention.

As schematically illustrated in FIG. 2, the mobility-activity processing module runs a database population method according to an embodiment of the invention. Mobility traces are used to generate a set of mobility-activity patterns that occur in the city (step 1). If many collaborative individuals (where collaborative individuals are the ones who share continuously their personal data records) have similar patterns they are clustered into mobility-activity groups (step 2). Examples of collaborative individuals are individuals that share their personal mobility information through social media posts or public transportation smart-card logs. Each mobility-activity pattern cluster contains information about:
1. The number of its members.
2. The demographics of its members (e.g., 30% women, etc.).
3. The predominant mobility-activity patterns of its members (similar for members at the same group).

The mobility-activity processing module for populating the database (OD-DB) uses user-generated data from collaborative users and information about city zones and city population. At the top part of FIG. 2 (local model), collaborative individuals that share their data are clustered into groups based on their mobility-activity patterns. Then, the local model is extended to a global model by allocating all non-collaborative users of the city to the clusters of the local model (step 3) after solving a combinatorial optimization problem with use of constraints (e.g., zonal information, home and work location of non-collaborative users, etc.). The aggregated mobility-activity patterns are summarized for the entire city to generate the expected OD trips for the city (step 4). The expected OD after solving this combinatorial optimization problem is compared with the real OD and the constraints/mobility patterns of the combinatorial problem are continuously updated (step 6) within a learning loop (step 5) every time a comparison between the expected and the real OD occurs, thereby reducing continuously the errors of the expected OD. The non-collaborative users' association to clusters is dynamically updatable based on the errors between the expected OD and the real, observed OD. The clusters themselves are also dynamically updatable based on the collaborative users' data updates. The database (OD-DB) is populated with the expected OD values (step 7) and can be continuously updated to further reduce errors and better match demands.

The approach illustrated in FIG. 2 shows that local data from collaborative users is used to form the mobility-activity patterns of different clusters and extend to global (city level, for example, entire city population=collaborative+non-collaborative users). According to an embodiment, a local representation model is used in the system as a system component in addition to global data for providing a global model that has the possibility to be updated with the use of a feedback loop that updates/mutates the mobility patterns and rule-based constraints of the allocation of the individuals to clusters after comparing the expected ODs with the real ODs.

Each non-collaborative individual from the entire population is allocated to one of the clusters with the constrained combinatorial optimization approach where the sum of OD trips from individuals at all clusters is expected to be similar to the real OD matrix of the city which is already known (i.e., from surveys or sensor monitoring). Locations of non-collaborative users can be derived from the residential areas in the city. According to an embodiment of a method of the invention, the combinatorial problem assigns the location to each not collaborative user also based on external information (e.g., demographics, where the residential areas are, where the working areas are) in an interactive process that improves with new data.

According to an embodiment the constraints of the combinatorial problem are (1) a set of zonal information and (2) a set of assigned geographical locations to non-collaborative users regarding their home/work/leisure activities. When further information is received regarding the real OD matrix (e.g., information from sensors, surveys), the allocation of non-collaborative users to mobility-activity clusters is updated based on the optimization of the combinatorial problem. This utilizes global-level data for improving continuously the constraint parameters of the model and reducing the OD estimation errors by training the combinatorial optimization model.

At each successful iteration, the allocation of the entire city population to clusters is pushed to the database (OD-DB) which can then populated with:
1. Information about the mobility movements of each individual in the city at different times of the day (e.g., an aggregation of those movements populates Entry III of the database of Table I above).
2. Information about the demographics about each individual with mobility activities (e.g., an aggregation of it populates Entry IV of the database of Table I above).
3. Information about activities of each individual in the city (e.g., an aggregation of it populates Entry V of the database of Table I above).
4. Information about mobility patterns of each individual (an aggregation of it populates Entry VI of the database of Table I above where the whole sequence of daily travels is present).

According to an embodiment, machine learning from the data is provided. Two data sets are received:
1. OD matrix observed, $OD_i$
2. Data on user mobility-activity from a set of collaborative users, as for example data from social media or public transport smartcard users, $sm_i$ For each new data set, an optimal user allocation is computed using predefined mobility-activity clusters, $\gamma$, based on the combinatorial optimization. The allocation/assignment is based on some probability models $\lambda$ that describe the reference user mobility-activity models of each cluster. The reference mobility-activity models of each cluster are computed from the collaborative users' data $\lambda_i = \lambda$ ($sm_i$). The actual allocation/assignment of the entire city's population is based on the minimization of the error of the derived OD matrix and the measured one as follows in Equation 1:

$$\gamma = \gamma^\theta(OD, \lambda) = \arg\min_\gamma \|OD - \Pi(\lambda^\theta(OD, \lambda), \gamma)\|^2 \quad \text{(Equation 1)}$$

Where $\Pi$ is the operator that derives the OD matrix from the assignment $\gamma$ and the reference mobility-activity model $\lambda$. In order to improve, learning from the data occurs using a function $\lambda^\theta(OD, \lambda)$ that returns the reference mobility-activity model parameters used in the assignment procedure (Equation 1). This function is improved over new data iteratively in accordance with Equation 2:

$$\theta = \arg\min_\theta \Sigma_i \|OD - \Pi(\lambda^\theta(OD_i, \lambda_i), \gamma^\theta(OD_i, \lambda_i))\|^2 + \xi\|\lambda_i - \lambda^\theta(OD_i, \lambda_i)\|^2 + H(\lambda^\theta(OD_i, \lambda_i)) \quad \text{(Equation 2)}$$

where the sum is taken over the observed data. In this way, the underlying user probability model and the interpretation of the available data are improved. In the optimization (Equation 2), some penalty can be included to promote user models for each cluster that are different among each other (e.g., by using the entropy maximizing the entropy of the models, symbolized by the function $H(\lambda)$).

According to an embodiment, a probabilistic model is used for extracting the mobility-activity patterns. This probabilistic model utilizes the historical mobility traces of each collaborative individual to derive his/her probability to travel from one location to a set of other locations (alternative destinations) at each specific time of the day. Given that individuals do not ordinarily travel without a reason, each destination is assigned to an activity. For instance, one location can be the home of the individual, another location can be the working place of the individual, whereas other locations can be locations of recurrent activities (e.g., classes or events) or non-recurrent ones (e.g., leisure trips). Activities to locations can be assigned with the use of ad hoc rules. For instance, the location where the individual starts mostly his/her first daily trip is most probably the home location. With similar ad-hoc rules, activities such as work, fixed or non-fixed activities are associated to re-visited locations using information such as travel times (e.g., between 8 AM and 5 PM weekdays or Monday evenings). One probabilistic model indicates then the probability of an individual to transfer from one location to a set of others and perform a specific activity at each of those locations for every time period of the day.

Figure 3:
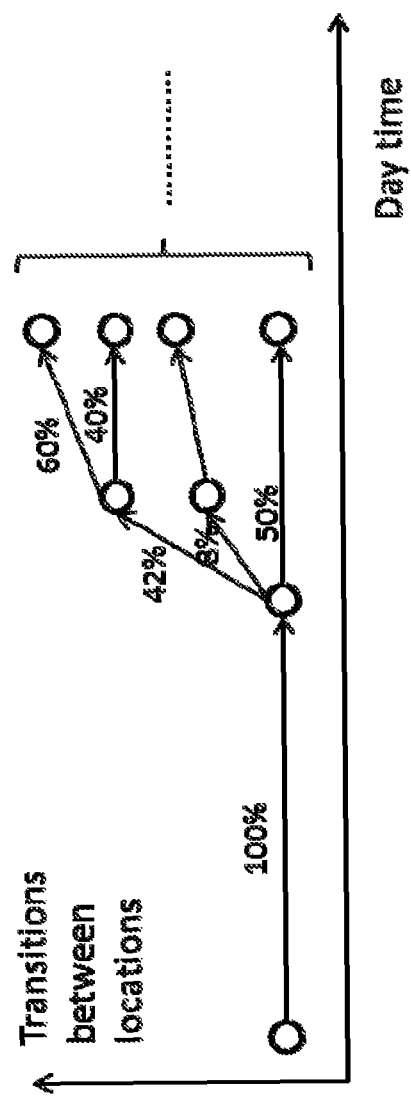
FIG. 3 is a graph view of a probabilistic model using historical user-generated traces.

FIG. 3 illustrates a probabilistic model describing the mobility-activity patterns of a user proving the probability of traveling from one location to another at every particular time period of the day for performing an activity. The information for this model is extracted from historical user-generated traces. Different probabilistic mobility-activity models from individuals are compared with each other with the use of the clustering techniques, and more specifically, the Density-based algorithm for Applications with Noise (DBSCAN) that calculates the similarity of different models based on the distance of their probabilities. Of course, different users visit different locations. Therefore, during the clustering, only the activity patterns and the time of location transfers are taken into consideration. Then, different clusters of mobility-activity patterns are formed where each group is a cluster of individuals with similar mobility-activity patterns. Each one of those groups is represented by each main mobility-activity model which describes the mobility-activity patterns of all individuals in that group.

Figure 4:
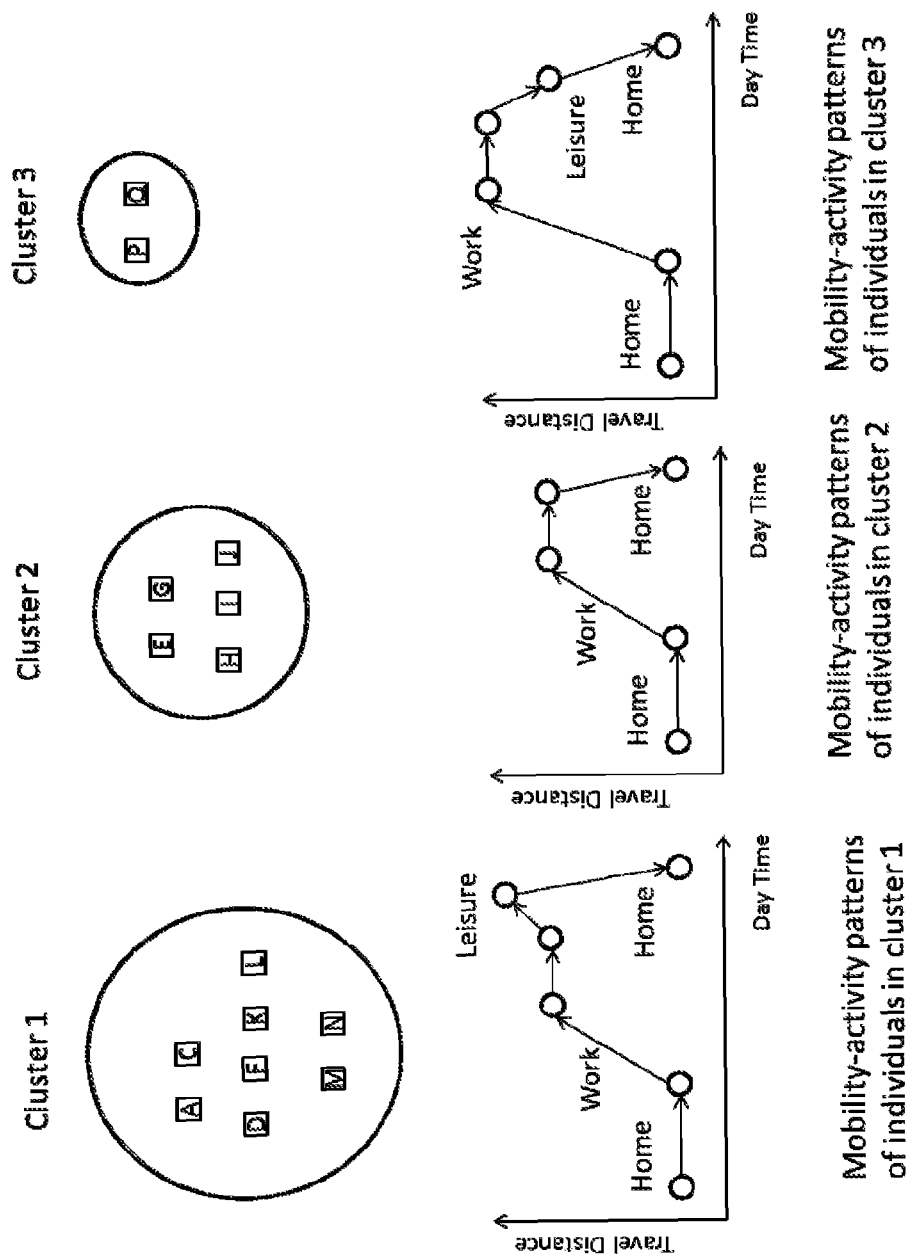
FIG. 4 shows representative mobility-activity patterns of individuals in different clusters.

FIG. 4 shows representative mobility-activity patterns of each cluster of individuals A-Q. The representative mobility-activity profiles that are derived from the sample set of users of the entire city's population are used to assign mobility traces to the non-collaborative population of the city for which there is no user-generated data (extending the local model representation to the global representation). For this reason, the aggregated demand in the city (OD demand matrix from surveys) is used as input and all individuals in the city are assigned in different clusters until their aggregated mobility traces return OD trips after solving the above-mentioned constrained combinatorial optimization problem. For assigning individuals from the population to each cluster and returning mobility traces from all users that are as close as possible to the observed OD demand, the combinatorial optimization problem needs to be solved and this is a labor-intense process (i.e., cannot be done manually) and requires high computing power. The unknown variables of this combinatorial problem are the allocation of discrete individuals to mobility-activity pattern profiles (clusters) subject to a number of constraints (zonal information, assigned activities of the cluster (home, work, etc.) to geographical locations from the city network for each non-collaborative user).

The combinatorial problem of assigning individuals from the general population to the observed mobility-activity patterns can have more than one acceptable solution that fits the observed OD due to its inherent degrees of freedom. For this reason, the enhanced information of the city's topology (zonal information) is utilized for adding more constraints (restrictions) to the problem of assigning mobility traces to non-collaborative individuals. For instance, the non-collaborative users' activities such as "home" are more probable to be assigned to locations of the city which belong to residential zones, whereas "work" activity locations are more probably to be assigned to industrial/service areas.

Figure 5:
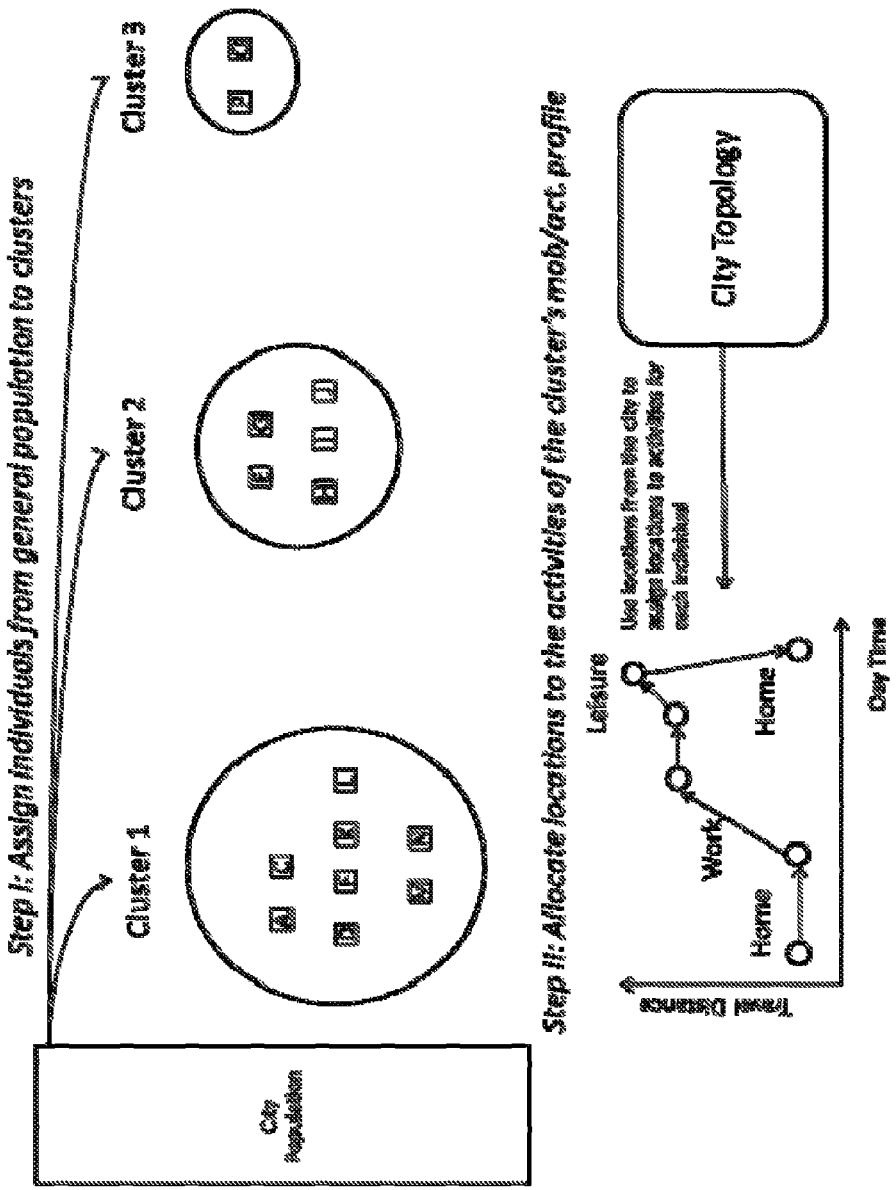
FIG. 5 is a schematic illustration of a method of allocating non-collaborative individuals to clusters and locations to those individuals.

FIG. 5 illustrates the allocating of non-collaborative individuals from the city population to the observed clusters and, for each individual, allocated locations from the city network to his/her activities based on the city's topology (e.g., residential zones, work zones, stadiums, shopping districts, etc.). After assigning the entire population to clusters, most likely their expected daily trips extracted from the probabilistic mobility-activity model will not match the real OD demand in the city. For this reason, a number of iterations can be performed where the mobility-activity models are updated according to Equations 1 and 2 and via this feedback loop, users are assigned iteratively to different clusters via solving the combinatorial optimization problem.

Embodiments of the present invention provide for the following advancements/improvements:

1. Use of a combinatorial problem to compute the optimal allocation/assignment of non-collaborative users to clusters and physical location based on the reference mobility-activity models of collaborative users. Equations 1 and 2 above evaluate the solution which is the pair $\lambda_i$ and $\gamma^\theta$ based on how they fit with the demand OD and the previous model. Therefore, Equations 1 and 2 illustrate the learning principle, where the model is updated based on previous learning (Equation 2) and new data (Equation 1). For minimization of the combinatorial problem described in Equations 1 and 2, a heuristic optimization approach can be utilized which performs well in optimizing discrete problems such as simulated annealing or a genetic algorithm.
2. Learning-based mutation of mobility-activity models for the continuously updated allocation of users to continuously updated mobility-activity pattern clusters with the use of an approximation function that learns from data updates regarding the (i) observed OD demand and (ii) collaborative users' mobility/activity patterns.
3. Use of a mobility-activity processing module for populating, modifying and querying a mobility trace database content and a system which interfaces applications and the database, for example, to dispatch vehicles or change vehicles times/routes in an on-demand transportation system.
4. A method that is able to build a mobility structure that infers the temporal and spatial relationship of the database elements and a set of attributes of each element (e.g., demographic groups, activities, travel sequences).
5. Higher granularity of targeted advertisement and demand-responsive public transportation with structuring and populating the database in order to contain the movements of persons, the underlying reasons behind those movements and other characteristics such as demographics, user activity preferences and trips' sequences.
6. Increases efficiency in OD matching by not being limited to collaborative data and thereby is able to produce a computational model that achieves matching and on-demand services not hitherto possible, which computational model continues to become more accurate through learning.

According to an embodiment, a method for structuring, updating and interfacing a mobility database includes the steps of:

1. Implementing the method illustrated in FIG. 1 that is based on the mobility-activity processing module by:
   a. Generating clusters and defining the mobility-activity model of each cluster from collaborative users' datasets (e.g., from user-generated social media data or smart-card data), the clusters being continuously updated given that the collaborative users' data is updated over time,
   b. Assigning non-collaborative users of the entire city's population to clusters via combinatorial optimization and extracting the estimated OD demand, and
   c. Using an approximation function that learns from continuously updated observed OD and activity-mobility data from collaborative users to re-allocate non-collaborative users to clusters and train the mobility-activity models of each cluster;
2. Combining real-time data and the queried OD information to generate a list of control actions with the use of the AFD; and
3. Implementing one or more of the control actions.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing a demand-responsive transportation system, the method comprising:
   receiving mobility trace data of collaborative individuals;
   generating clusters of individuals based on mobility-activity patterns of the collaborative individuals and defining a mobility-activity model for each of the clusters;
   assigning non-collaborative individuals to the clusters using a combinatorial optimization problem;
   determining an Origin-Destination (OD) demand from the clusters including the collaborative and the non-collaborative individuals;
   re-allocating at least some of the non-collaborative individuals to different ones of the clusters using an approximation function that learns from an observed OD and the mobility trace data of the collaborative users;
   training the mobility-activity models based on the re-allocation of the non-collaborative individuals to different ones of the clusters;
   maintaining an OD database (OD-DB) including a current OD demand determined from the trained mobility-activity models;
   querying the OD-DB with a geographic location and time so as to receive information from the OD-DB about the current OD demand for the geographic location and time; and
   issuing control actions to vehicles in a fleet of the transportation system using real-time information about the fleet and the information about the current OD demand from the OD-DB.

2. The method according to claim 1, further comprising modifying an allocation of the vehicles in the fleet.

3. The method according to claim 1, further comprising introducing a new service line and dispatching an additional vehicle for the new service line based on the current OD demand not being serviceable by the fleet.

4. The method according to claim 1, wherein the control actions include sending instructions to an on-board unit of one of the vehicles in the fleet with a new time and location for a passenger pick-up or drop-off.

5. The method according to claim 1, wherein the re-allocating and the training are performed continuously or iteratively using the observed OD that is updated continuously or iteratively based on sensor data and additional mobility trace data received for the collaborative individuals.

6. The method according to claim 5, wherein the mobility-activity models of the clusters are continuously or iteratively updated using the additional mobility trace data received for the collaborative individuals.

7. The method according to claim 1, wherein the mobility trace data of the collaborative individuals includes at least one of social media data or smartcard data of the transportation system.

8. A demand-responsive transportation system, the transportation system comprising:
   a mobility-activity processing module including one or more processors which, alone or in combination, are configured to provide for the following steps:
      receiving mobility trace data of collaborative individuals;
      generating clusters of individuals based on mobility-activity patterns of the collaborative individuals and defining a mobility-activity model for each of the clusters;
      assigning non-collaborative individuals to the clusters using a combinatorial optimization problem;
      determining an Origin-Destination (OD) demand from the clusters including the collaborative and the non-collaborative individuals;
      re-allocating at least some of the non-collaborative individuals to different ones of the clusters using an approximation function that learns from an observed OD and the mobility trace data of the collaborative users;
      training the mobility-activity models based on the re-allocation of the non-collaborative individuals to different ones of the clusters; and
      maintaining an OD database (OD-DB) including a current OD demand determined from the trained mobility-activity models, and
   an Automated Fleet Dispatcher (AFD) including one or more processors which, alone or in combination, are configured to provide for the following steps:
      querying the OD-DB with a geographic location and time so as to receive information from the OD-DB about the current OD demand for the geographic location and time; and
      issuing control actions to vehicles in a fleet of the transportation system using real-time information about the fleet and the information about the current OD demand from the OD-DB.

9. The transportation system according to claim 8, further comprising the fleet of transportation vehicles which communicate with the AFD.

10. The transportation system according to claim 9, wherein the AFD is configured to modify an allocation of the vehicles as one of the control actions.

11. The transportation system according to claim 9, wherein the AFD is configured to introduce a new service line and dispatch an additional vehicle for the new service line based on the current OD demand not being serviceable by the fleet as one of the control actions.

12. The transportation system according to claim 9, wherein the control actions include sending instructions to an on-board unit of one of the vehicles in the fleet with a new time and location for a passenger pick-up or drop-off.

13. The transportation system according to claim 8, wherein the re-allocating and the training are performed continuously or iteratively using the observed OD that is updated continuously or iteratively based on sensor data and additional mobility trace data received for the collaborative individuals.

14. The transportation system according to claim 13, wherein the mobility-activity models of the clusters are continuously or iteratively updated using the additional mobility trace data received for the collaborative individuals.

15. A system for maintaining a mobility trace database, the system comprising one or more processors which, alone or in combination, are configured to provide for the following steps:
   receiving mobility trace data of collaborative individuals;
   generating clusters of individuals based on mobility-activity patterns of the collaborative individuals and defining a mobility-activity model for each of the clusters;

assigning non-collaborative individuals to the clusters using a combinatorial optimization problem;
determining an Origin-Destination (OD) demand from the clusters including the collaborative and the non-collaborative individuals;
re-allocating the non-collaborative individuals to different ones of the clusters using an approximation function that learns from an observed OD and the mobility trace data of the collaborative users;
training the mobility-activity models based on the re-allocation of the non-collaborative individuals to different ones of the clusters; and
maintaining the database including a current OD demand determined from the trained mobility-activity models.

* * * * *